(12) United States Patent
Zhang et al.

(10) Patent No.: US 10,737,730 B2
(45) Date of Patent: Aug. 11, 2020

(54) HIGH-RIGIDITY VEHICLE BODY FRAME

(71) Applicant: GUANGZHOU AUTOMOBILE GROUP CO., LTD., Guangzhou, Guangdong (CN)

(72) Inventors: Qi Zhang, Guangdong (CN); Xiangzheng Liu, Guangdong (CN); Dong Chen, Guangdong (CN); Xiaochun Tu, Guangdong (CN); Furong Geng, Guangdong (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 172 days.

(21) Appl. No.: 16/096,709

(22) PCT Filed: May 16, 2017

(86) PCT No.: PCT/CN2017/084598
§ 371 (c)(1),
(2) Date: Oct. 26, 2018

(87) PCT Pub. No.: WO2017/202229
PCT Pub. Date: Nov. 30, 2017

(65) Prior Publication Data
US 2019/0152533 A1 May 23, 2019

(30) Foreign Application Priority Data

May 24, 2016 (CN) .......................... 2016 1 0352778

(51) Int. Cl.
*B62D 23/00* (2006.01)
*B62D 25/02* (2006.01)
(Continued)

(52) U.S. Cl.
CPC ........... *B62D 23/005* (2013.01); *B62D 25/02* (2013.01); *B62D 25/2036* (2013.01); *B62D 25/06* (2013.01)

(58) Field of Classification Search
CPC .. B62D 23/005; B62D 25/2036; B62D 25/02; B62D 25/06; B62D 23/00
(Continued)

(56) References Cited

U.S. PATENT DOCUMENTS 6,205,736 B1 * 3/2001 Amborn ................ B21C 37/294
296/203.01
6,322,105 B1 * 11/2001 Na ......................... B62D 21/08
280/781

(Continued)

FOREIGN PATENT DOCUMENTS

CN 100425495 C 10/2008

*Primary Examiner* — Pinel E Romain

(57) ABSTRACT

A high-rigidity vehicle body frame includes a front panel frame, a floor frame, a roof frame and two side frames. The floor frame includes a floor front beam, two floor side beams and a floor support member. The side frames includes a side front vertical beam, a side middle vertical beam and a side rear vertical beam. The roof frame includes a roof support member and two roof side beams each of which is fixed to the side front vertical beam, the side middle vertical beam and the side rear vertical beam at a same side, and the roof support member is fixed between the two roof side beams. The front panel frame fixed between the two roof side beams includes an X-shaped front support member which is fixed on the floor front beam. The lateral deformation resistance and the bending deformation resistance of the vehicle body are enhanced.

13 Claims, 4 Drawing Sheets

(51) Int. Cl.
*B62D 25/20* (2006.01)
*B62D 25/06* (2006.01)

(58) Field of Classification Search
USPC .................................................. 296/203.01
See application file for complete search history.

(56) References Cited

U.S. PATENT DOCUMENTS

| | | | | |
|---|---|---|---|---|
| 7,322,106 | B2* | 1/2008 | Marando | B22D 19/045 |
| | | | | 29/507 |
| 7,677,343 | B2* | 3/2010 | Kitai | B60K 5/12 |
| | | | | 180/291 |
| 8,851,558 | B2* | 10/2014 | Asaga | B62D 25/00 |
| | | | | 296/203.01 |
| 8,955,632 | B2* | 2/2015 | Schurna | B62D 23/005 |
| | | | | 180/210 |
| 9,975,179 | B2* | 5/2018 | Czinger | G06F 30/15 |
| 10,029,736 | B1* | 7/2018 | Arora | B62D 25/06 |
| 2004/0080188 | A1 | 4/2004 | Igarashi et al. | |
| 2007/0085382 | A1* | 4/2007 | Floth | B62D 25/04 |
| | | | | 296/203.01 |
| 2009/0184541 | A1 | 7/2009 | Yamamura et al. | |
| 2012/0047841 | A1* | 3/2012 | Fyfe | E04B 5/046 |
| | | | | 52/695 |
| 2013/0239476 | A1* | 9/2013 | Meyer | A01G 25/00 |
| | | | | 47/65.9 |
| 2015/0184369 | A1* | 7/2015 | Carless | E04B 1/1909 |
| | | | | 52/36.4 |

\* cited by examiner

HIGH-RIGIDITY VEHICLE BODY FRAME

FIELD OF THE INVENTION

The present invention relates to an automotive engineering technology and, more particularly to a high-rigidity vehicle body frame.

BACKGROUND OF THE INVENTION

Vehicle body frame is a crucial factor of bending and torsion resistance for vehicle body. A good vehicle body frame can improve the bending and torsion performance of the vehicle body, reduce the weight of the vehicle body, and achieve lightweight. However, how to effectively arrange the beams on the force transmission path to maximize and optimize its support force is a major difficulty in the field of automotive engineering technology.

Chinese patent application No. 200510112807.5 discloses a vehicle body frame which includes a front frame module connected with a passenger compartment frame module which is connected with a rear frame module. Further, the front frame module, the passenger compartment frame module and the rear frame module are connected with a lower frame module. Such a vehicle body frame may help to suitably set the vehicle size and rigidity, and improve the rigidity of the vehicle body frame at the longitudinal direction. However, this application only improves the lower structure of the vehicle body, instead of the whole structure of the vehicle body, thus the rigidity of the vehicle body at transverse direction and the vertical direction can't be enhanced.

Therefore, there is a need to provide a vehicle body frame to enhance the rigidity of the whole vehicle body.

SUMMARY OF THE INVENTION

One objective of the present invention is to provide a vehicle body frame which has high rigidity.

To achieve the above-mentioned objective, a high-rigidity vehicle body frame of the present invention includes a front panel frame, a floor frame, a roof frame and two side frames. The floor frame includes a floor front beam, two floor side beams fixed on two ends of the floor front beam, and a floor support member fixed between the two floor side beams. The side frames includes, from front to back, a side front vertical beam, a side middle vertical beam and a side rear vertical beam which are fixed on the floor side beam at intervals. The roof frame includes a roof support member and two roof side beams each of which is fixed to the side front vertical beam, the side middle vertical beam and the side rear vertical beam at a same side, and the roof support member is fixed between the two roof side beams. The front panel frame connected and fixed between the two roof side beams includes a front support member which is fixed on the floor front beam and has an X-shaped structure.

In comparison with the prior art, the high-rigidity vehicle body frame includes a front panel frame, a floor frame, a roof frame and two side frames. The front panel frame is served as a first bending barrier to resist the possible front bending force; and the two side vertical beams, the X-shaped roof support member and the H-shaped floor support member embrace the middle of the vertical body so as to serve as a second barrier to resist the possible middle bending force. The front support member, the roof support member, and the floor support member can enhance the lateral deformation resistance and the bending deformation resistance, so that the rigidity of the whole vehicle body is improved at transverse direction, longitudinal direction and vertical direction.

Preferably, the front panel frame further comprises two front panel beams and two front panel side beams, one end of the front panel beam is fixed to an upper end of the front support member, another end of the front panel beam is fixed to a front end of the roof side beam and an upper end of the front panel side beam, and a lower end of the front panel side beam is fixed to the front end of the floor side beam. In such a way, a steady connection is formed among the front support member, the side frame, the front support member and roof frame, due to the configurations of the front panel beam and the front panel side beam.

Specifically, the front panel frame further comprises two front panel vertical beams which are supported on two sides of the front support member, and two ends of the front panel vertical beam are fixed to the front panel beam and the floor front beam. Since the two front panel vertical beams are formed at two sides of the front support member to reinforce the support, thus the bending resistance of the front support member (namely the first barrier) is improved.

Specifically, the front support member and the two front panel vertical beams are bent forward; therefore the internal space of the vehicle is increased.

Preferably, the floor support member has an H-shaped structure. With such an H-shaped structure, the rigidity of the floor frame at a longitudinal direction and a transverse direction of the vehicle body is enhanced.

Specifically, the floor frame further comprises multiple floor front connecting beams which are connected between the floor front beam and the floor support member. In such a way, the rigidity of the front part of floor frame at a longitudinal direction of the vehicle body is enhanced.

Preferably, the floor frame further comprises a floor stiffener which is a rhomboid structure and connected between two rear ends of the two floor side beams, and further located at rear of the floor support member. In such a way, the rigidity of the rear part of the floor frame at a longitudinal direction and a transverse direction of the vehicle body is enhanced.

Specifically, the floor frame further comprises a floor rear connecting beam which is connected between the floor support member and the floor stiffener. The function of the floor rear connecting beam is the same with that of the floor front connecting beam, and the whole structure of the floor frame is further stable.

Preferably, the roof support member is in an X-shaped structure. With such an X-shaped structure, the rigidity of the roof support member at a longitudinal direction and a transverse direction of the vehicle body is enhanced.

Specifically, the roof frame further comprises a roof front beam and a roof rear beam, the roof rear beam is fixed between two rear ends of the two roof side beams, the roof front beam is fixed between the two roof side beams, and the roof support member is located between the roof front beam and the roof rear beam. In such a way, the rigidity of the roof frame at a transverse direction of the vehicle body is enhanced.

Preferably, the side frame further comprises a connecting member and a side tail vertical beam, the floor frame further comprises a floor rear beam, one end of the connecting member is fixed to a rear end of the floor side beam, another end of the connecting member is fixed to an end of the floor rear beam, an upper end of the side tail vertical beam is fixed to an upper end of the side rear vertical beam and a rear end of the roof side beam respectively, and a lower end of the side tail vertical beam is fixed to the floor rear beam. In such a way, the side front beams, side tail vertical beams, the connecting members and the floor rear beam form a third barrier which is a tower-shaped structure to resist the possible rear bending force and further compensate the possible front bending force.

Specifically, the connecting member is an upright rectangular frame structure, the side frame further comprises a side front connecting beam and side rear connecting beam, and the side front connecting beam is connected between the connecting member and the side rear vertical beam, and the side rear connecting beam is connected between the connecting member and the side tail vertical beam. In such a way, the structure of the third barrier is strengthened, so as to further increase the rigidity of the vehicle body.

More specifically, two side front connecting beams are included, one end of either side front connecting beam is connected with one another and connected to an upper end of the connecting member, and another end of either side front connecting beam is connected with the side rear vertical beam at intervals. In such a way, a triangular structure is formed by the two side front connecting beams and the side rear vertical beam, thus the structure is stable.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

A distinct and full description of the technical solution of the present invention will follow by combining with the accompanying drawings.

Figure 1:
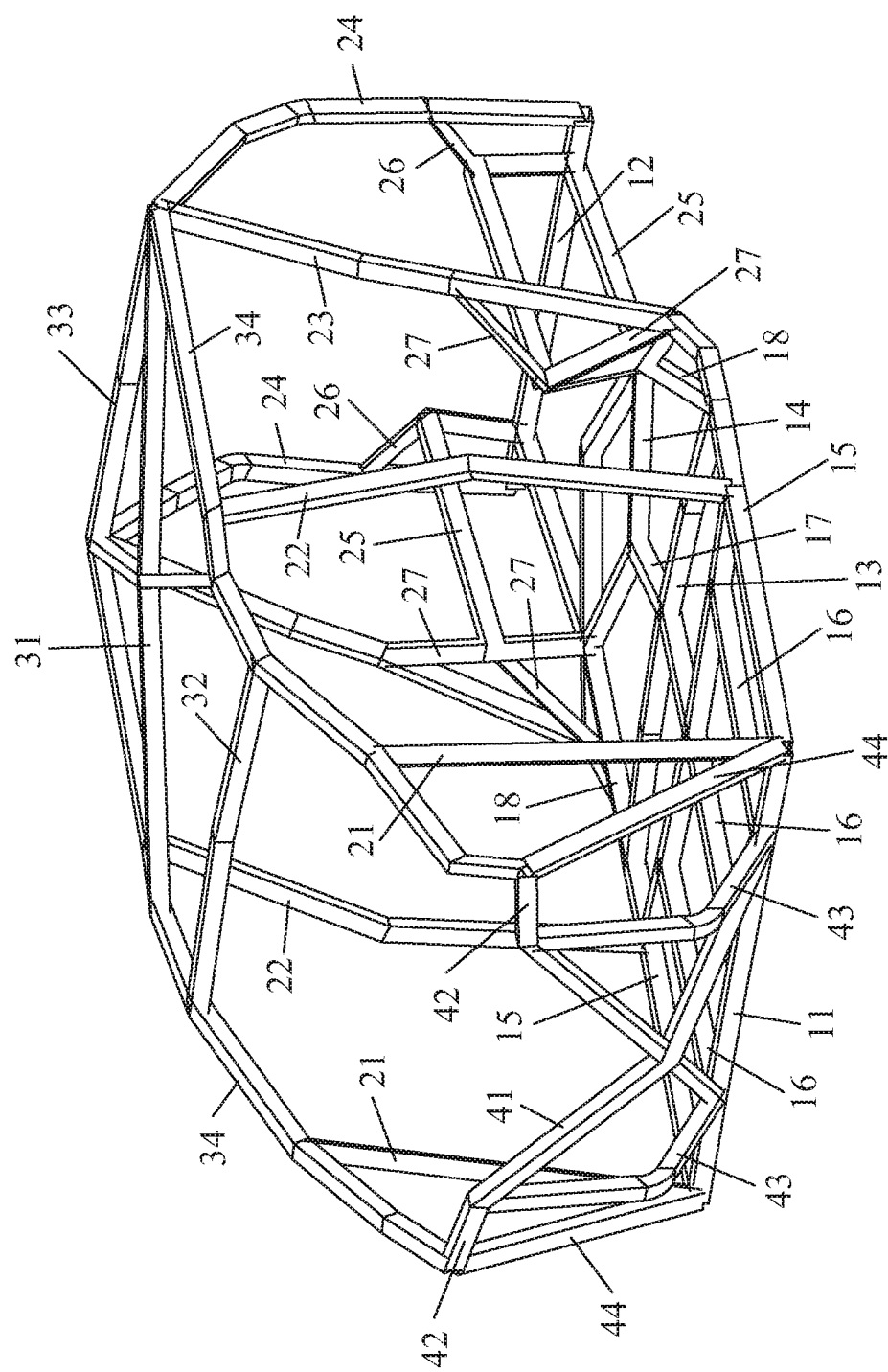
FIG. 1 is a perspective view of a vehicle body frame according to a first embodiment of the present invention.
Figure 2:
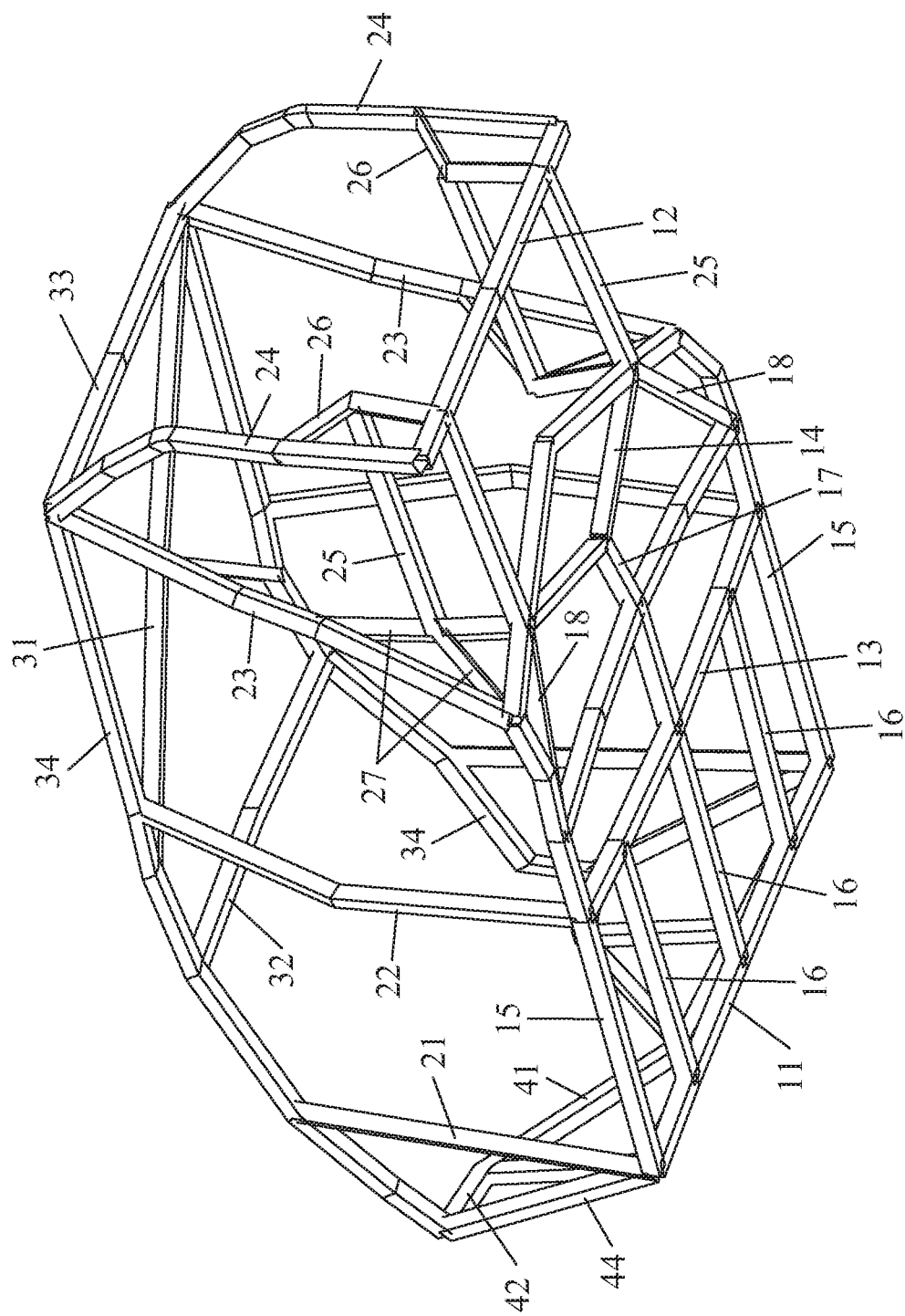
FIG. 2 is another perspective view of the vehicle body frame to the first embodiment of the present invention.
Figure 3:
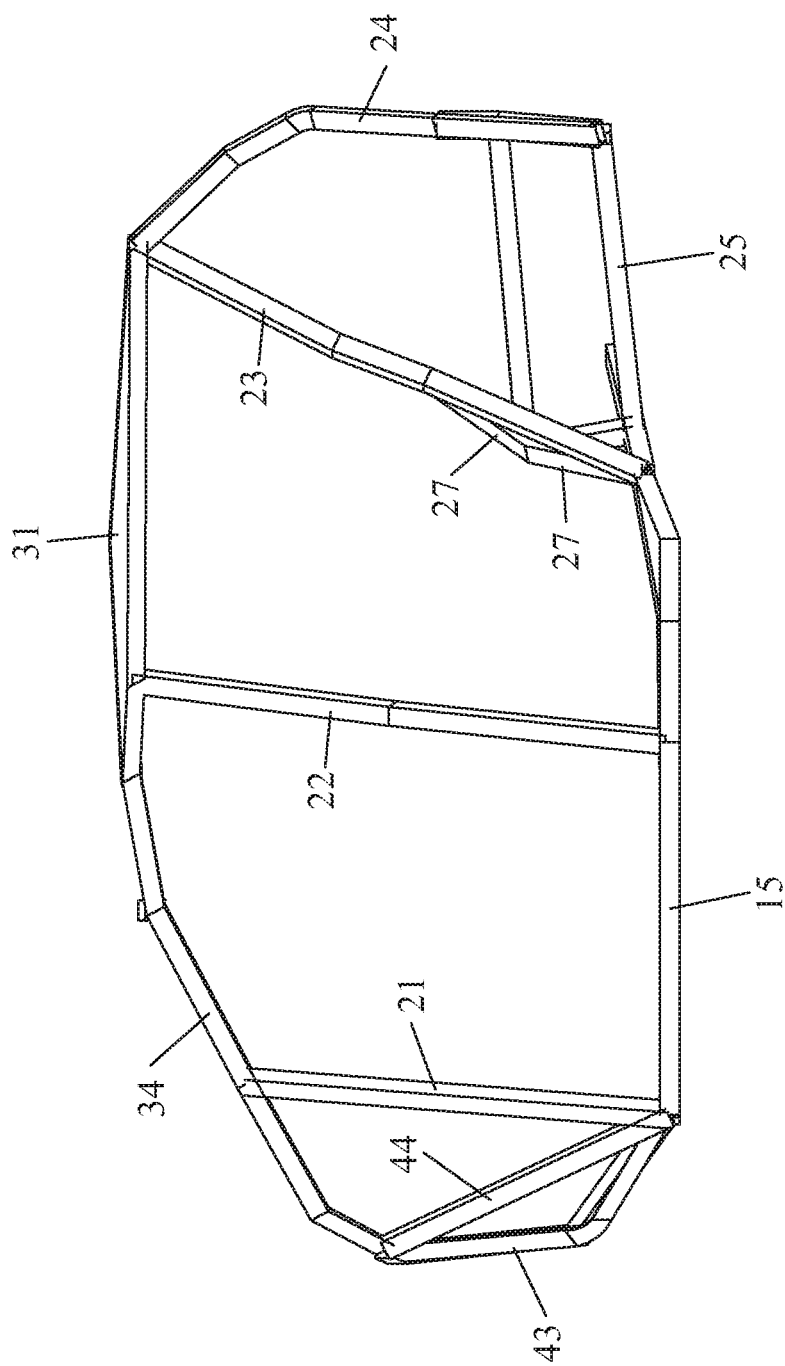
FIG. 3 is a side view of the vehicle body frame to the first embodiment of the present invention.
Figure 4:
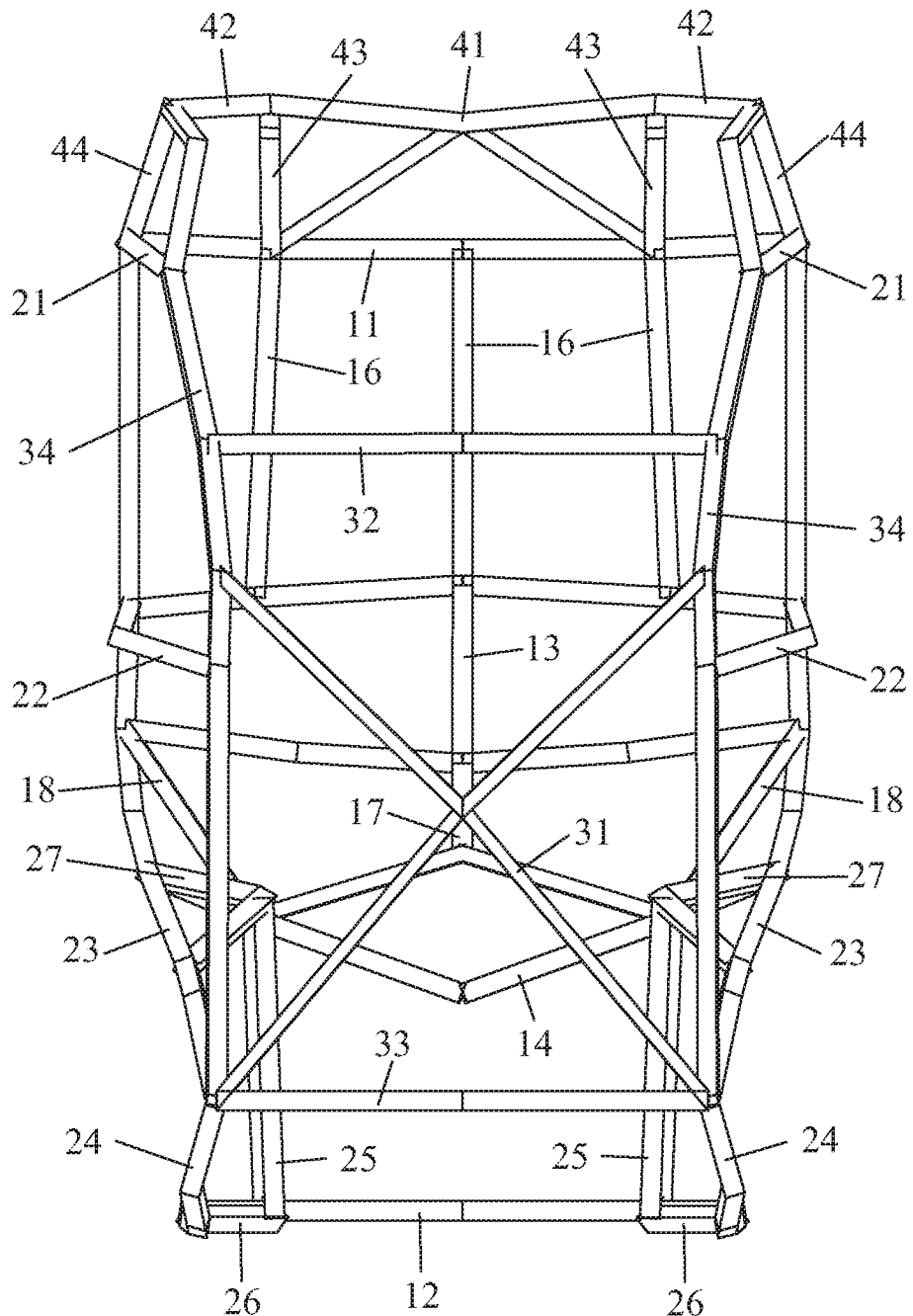
FIG. 4 is a top view of the vehicle body frame to the first embodiment of the present invention.

Referring to FIGS. 1-4, a high-rigidity vehicle body frame includes a front panel frame, a floor frame, a roof frame and two side frames. The front panel frame is fixed at a front end of the floor frame, the two side frames are fixed at two sides of the floor frame, and the roof frame is fixed between upper ends of the two side frames. In such a way, fifth frames are steadily connected one another to enhance the bending resistance of the entire vehicle frame.

The floor frame includes a floor front beam 11, a floor rear beam 12, a floor support member 13, a floor stiffener 14 and two floor side beams 15. Specifically, front ends of the two floor side beams 15 are fixed at two ends of the floor front beam 11, the rear ends of the floor side beams 15 are bent inwards, the floor stiffener 14 is a diamond-shaped structure and connected between the rear ends of the two floor side beams 15. The floor stiffener 13 has an H-shaped structure and is supported between the two floor side beams 15; specifically, the H-shaped structure has two long sides connected with the floor side beams 15 and two short sides parallel to the floor side beams 15. Preferably, the position of the floor support member 13 is located between the floor front beam 11 and the floor stiffener 14. Further, the floor frame includes three floor front connecting beams 16 and three floor rear connecting beams. The three floor front connecting beams 16 are parallel and fixed between the floor front beam 11 and the floor support member 13 at intervals, so as to enhance the rigidity of the vehicle frame in a longitudinal direction of the vehicle frame. The three floor rear connecting beams are connected between the floor support member 13 and floor stiffener 14. Specifically, the three floor rear connecting beams includes a short beam 17 connected at middle positions of the floor support member 13 and floor stiffener 14, and two long beams 18 which are titled. Specifically, one end of the long beam 18 is fixed to the rear connecting ends of the floor stiffener 14 an the floor side beam 15, another end of the long beam 18 is fixed to the connecting position of the floor support member 13 and the floor side beam 15.

The floor rear beam 12 of the floor frame is connected between the two side frames, and the detailed structures of the side frames and the detailed configuration manner are described as below.

Each side frame includes a side front vertical beam 21, a side middle vertical beam 22, a side rear vertical beam 23, a side tail vertical beam 24 and a connecting member 25. The lower ends of the side front vertical beam 21, the side middle vertical beam 22, and the side rear vertical beam 23, from front to back, are fixed on the floor side beam on the same side. Spacing between the side front vertical beam 21 and the side middle vertical beam 22 is adapted for mounting a front car door, and spacing between the side middle vertical beam 22 and the side rear vertical beam 23 us adapted for mounting a rear car door. One end of the connecting member 25 of each side frame is fixed to rear ends of the floor side beams 15, thus the floor stiffener 14 is configured between two connecting members 25. Another end of the connecting member 25 is fixed to an end of the floor rear beam 15, thus the floor rear beam 12 is parallel to the floor front beam 11 substantially. The lower end of the side tail vertical beam 24 is fixed to the end of the floor rear beam 12, the upper end of the side tail vertical beam 24 is bent forward and fixed to the upper end of the side rear vertical beam 23. In such a way, the side rear vertical beam 23, the side tail vertical beam 24 and the connecting member 25, on the same side, form a tower-shaped steady structure. More specifically, the connecting member 25 is a vertical rectangular structure; the lower sides of the connecting member 25 are connected to two ends of the floor rear beam 12 of the floor side beam 15, while the spacing between the two connecting member 25 is the space of the car boot. Additionally, the side frame further includes a side rear connecting beam 26 and two side front connecting beams 27. One end of the side rear connecting beam 26 is fixed to the rear end of the upper side of the connecting member 25, and the side rear connecting beam 26 is tilted and extended upward to connect with the side tail vertical beam 24. One end of each side front connecting beam 27 is fixed to the front end of the connecting member 25, another end of each side front connecting beam 27 is connected to the front end of the upper side of the connecting member 25, in such a way, the connecting member 25, the side rear vertical beam 23 and the floor side beam 15 form a triangular support structure.

The roof frame includes a roof support member 31, a roof front beam 32, a roof rear beam 33 and two roof side beams 34. Specifically, each roof side beam 34 is extended along the vehicle body and fixed to upper ends of the side front vertical beam 21, the side middle vertical beam 22 and the side rear vertical beam 23 at the same side. The connecting positions of the side front vertical beam 21, the side middle vertical beam 22 and the side rear vertical beam 23 are distributed on the roof side beam 34 at intervals, more specifically, the side rear vertical beam 23 and side tail vertical beam 24 are fixed on the end of the roof side beam 34. The front end of the roof side beam 34 is bent downward to connect with the front panel frame, the roof front beam 32 is fixed between the two roof side beams 34, and the roof rear beam 33 is fixed between the rear ends of the roof side beams 34. The roof support member 31 is an X-shaped structure and supported between the two roof side beams 34, and the position of the roof support member 31 is located between the roof front beam 32 and the roof rear beam 33.

The front panel frame is connected and fixed between the two roof side beams 34, and includes a front support member 41, two front panel beams 42, two front panel vertical beams 43 and two front panel side beams 44. The front support member 41 is fixed on the floor front beam 11 and has an X-shaped structure, and the front support member 41 is set upright and tilted forward. The two front panel vertical beams 43 are supported and fixed at two sides of the front support member 41, and the lower end of the front panel vertical beams 43 is fixed to the floor front beam 11. One end of the front panel beam 42 is fixed on the upper end of the front panel vertical beam 43, another end of the front panel beam 42 is fixed to the front end of the roof side beam 34. The upper end of the front panel side beam 44 is fixed to the end of the front panel beam 42, and the lower end of the front panel side beam 44 is fixed to the front end of the floor side beam 15. Specifically, the front support member 41 and the two front panel vertical beams 43 are bent forward at the middle position, so that the internal space of the vehicle body is increased.

In the present invention, the front panel frame is served as a first bending barrier to resist the possible front bending force; the two side vertical beams 22, the X-shaped roof support member 31 and the H-shaped floor support member 13 embrace the middle of the vertical body so as to serve as a second barrier to resist the possible middle bending force; and the side front beams 23, side tail vertical beams 24, the connecting members 25 and the floor rear beam 12 form a third barrier which is a tower-shaped structure to resist the possible rear bending force and further compensate the possible front bending force.

In comparison with the prior arts, the present invention utilizes the front support member 41, the roof support member 31, the floor support member 13 and the floor stiffener 14 by which X-shaped structure, H-shaped structure, and rhomboid structure are formed to enhance the lateral deformation resistance and the bending deformation resistance, so that the rigidity of the whole vehicle body is improved at transverse direction, longitudinal direction and vertical direction.

While the invention has been described in connection with what are presently considered to be the most practical and preferable embodiments, it is to be understood that the invention is not to be limited to the disclosed embodiments, but on the contrary, is intended to cover various modifications and equivalent arrangements included within the spirit and scope of the invention.

What is claimed is:

1. A high-rigidity vehicle body frame, comprising a front panel frame, a floor frame, a roof frame and two side frames, the front panel frame being fixed at a front end of the floor frame, the two side frames being fixed at two sides of the floor frame, and the roof frame being fixed between upper ends of the two side frames;

wherein the floor frame comprises a floor front beam, a floor support member and two floor side beams which have front ends fixed on two ends of the floor front beam, and the floor support member is fixed between the two floor side beams;

each side frames comprises, from front to back, a side front vertical beam, a side middle vertical beam and a side rear vertical beam which are fixed on the floor side beam at intervals;

the roof frame comprises a roof support member and two roof side beams each of which is fixed to the side front vertical beam, the side middle vertical beam and the side rear vertical beam at a same side, and the roof support member is fixed between the two roof side beams; and the front panel frame connected and fixed between the two roof side beams comprises a front support member which is fixed on the floor front beam and has an X-shaped structure.

2. The high-rigidity vehicle body frame according to claim 1, wherein the front panel frame further comprises two front panel beams and two front panel side beams, one end of the front panel beam is fixed to an upper end of the front support member, another end of the front panel beam is fixed to a front end of the roof side beam and an upper end of the front panel side beam, and a lower end of the front panel side beam is fixed to the front end of the floor side beam.

3. The high-rigidity vehicle body frame according to claim 2, wherein the front panel frame further comprises two front panel vertical beams which are supported on two sides of the front support member, and two ends of the front panel vertical beam are fixed to the front panel beam and the floor front beam.

4. The high-rigidity vehicle body frame according to claim 3, wherein the front support member and the two front panel vertical beams are bent forward.

5. The high-rigidity vehicle body frame according to claim 1, wherein the floor support member has an H-shaped structure.

6. The high-rigidity vehicle body frame according to claim 5, wherein the floor frame further comprises multiple floor front connecting beams which are connected between the floor front beam and the floor support member.

7. The high-rigidity vehicle body frame according to claim 1, wherein the floor frame further comprises a floor stiffener which is a rhomboid structure and connected between two rear ends of the two floor side beams, and further located at rear of the floor support member.

8. The high-rigidity vehicle body frame according to claim 7, wherein the floor frame further comprises a floor rear connecting beam which is connected between the floor support member and the floor stiffener.

9. The high-rigidity vehicle body frame according to claim 1, wherein the roof support member is in an X-shaped structure.

10. The high-rigidity vehicle body frame according to claim 9, wherein the roof frame further comprises a roof front beam and a roof rear beam, the roof rear beam is fixed between two rear ends of the two roof side beams, the roof front beam is fixed between the two roof side beams, and the roof support member is located between the roof front beam and the roof rear beam.

11. The high-rigidity vehicle body frame according to claim 1, wherein the side frame further comprises a connecting member and a side tail vertical beam, the floor frame further comprises a floor rear beam, one end of the connecting member is fixed to a rear end of the floor side beam, another end of the connecting member is fixed to an end of the floor rear beam, an upper end of the side tail vertical beam is fixed to an upper end of the side rear vertical beam and a rear end of the roof side beam respectively, and a lower end of the side tail vertical beam is fixed to the floor rear beam.

12. The high-rigidity vehicle body frame according to claim 11, wherein the connecting member is an upright rectangular frame structure, the side frame further comprises a side front connecting beam and side rear connecting beam, and the side front connecting beam is connected between the connecting member and the side rear vertical beam, and the side rear connecting beam is connected between the connecting member and the side tail vertical beam.

13. The high-rigidity vehicle body frame according to claim 12, wherein two side front connecting beams are included, one end of either side front connecting beam is connected with one another and connected to an upper end of the connecting member, and another end of either side front connecting beam is connected with the side rear vertical beam at intervals.

\* \* \* \* \*